(12) United States Patent
Hussain

(10) Patent No.: US 11,062,424 B2
(45) Date of Patent: Jul. 13, 2021

(54) SYSTEMS AND METHODS FOR MOTION ADAPTIVE FILTERING AS PRE-PROCESS TO VIDEO ENCODING

(71) Applicant: Microsoft Technology Licensing, LLC, Redmond, WA (US)

(72) Inventor: Zahid Hussain, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 16/597,006

(22) Filed: Oct. 9, 2019

(65) Prior Publication Data

US 2021/0110512 A1 Apr. 15, 2021

(51) Int. Cl.
*G06K 9/32* (2006.01)
*G06T 3/40* (2006.01)
(Continued)

(52) U.S. Cl.
CPC ............. *G06T 3/40* (2013.01); *G06T 5/003* (2013.01); *G06T 7/579* (2017.01); *G06T 9/00* (2013.01);
(Continued)

(58) Field of Classification Search
CPC .... H04N 1/3872; H04N 1/3875; H04N 1/387; H04N 19/172; H04N 19/513; H04N 19/30; G06T 5/001; G06T 11/60; G06T 3/0012; G06T 1/0078; G06T 7/73; G06T 3/40; G06T 9/00; G06T 7/579; G06T 5/003;
(Continued)

(56) References Cited

U.S. PATENT DOCUMENTS

| 10,200,632 B2 * | 2/2019 | Thumpudi | ............... G06T 5/003 |
| 2017/0127085 A1 * | 5/2017 | Sun | ....................... H04N 19/186 |
| 2018/0035058 A1 * | 2/2018 | Thumpudi | ................ G06T 7/90 |

FOREIGN PATENT DOCUMENTS

| EP | 1445961 A2 | 8/2004 |
| WO | 02089486 A2 | 11/2002 |

OTHER PUBLICATIONS

Mrak, et al., "An Overview of Basic Techniques Behind Scalable Video Coding", In Proceedings of 46th International Symposium on Electronics in Marine, Jun. 16, 2004, pp. 597-602.
(Continued)

*Primary Examiner* — Duy M Dang
(74) *Attorney, Agent, or Firm* — Ray Quinney & Nebeker P.C.; John O. Carpenter

(57) ABSTRACT

A method of providing visual information to a user includes receiving a first frame having a first resolution, downscaling the first frame to a second resolution, the second resolution being lower resolution than the first resolution, receiving a second frame having the first resolution, downscaling the second frame to the second resolution, comparing the first frame at the second resolution to the second frame at the second resolution to create a second resolution motion vector field, seeding a seeded first resolution motion vector field, comparing the first frame at the first resolution to the second frame at the first resolution to refine the seeded first resolution motion vector field to create a refined first resolution motion vector field, and applying a blur filter to the first frame at the first resolution based on the refined first resolution motion vector field to create a filtered first frame.

20 Claims, 7 Drawing Sheets

(51) Int. Cl.
*G06T 9/00* (2006.01)
*G06T 5/00* (2006.01)
*H04N 19/513* (2014.01)
*H04N 19/30* (2014.01)
*H04N 19/172* (2014.01)
*G06T 7/579* (2017.01)

(52) U.S. Cl.
CPC ............ *H04N 19/172* (2014.11); *H04N 19/30* (2014.11); *H04N 19/513* (2014.11); *G06T 2207/10024* (2013.01)

(58) Field of Classification Search
CPC ........ G06T 2207/10024; G06K 9/3233; G06F 3/0484; G06F 3/04842; G06N 3/088
See application file for complete search history.

(56) References Cited

OTHER PUBLICATIONS

Ohm, J-R, "Motion-Compensated 3-D Subband Coding with Multiresolution Representation of Motion Parameters", In Proceedings of 1st International Conference on Image Processing, vol. 3, Nov. 13, 1994, pp. 250-254.

"International Search Report and Written Opinion Issued in PCT Application No. PCT/US20/050931", dated Nov. 4, 2020, 12 Pages.

Rekleitis, Ioannis M., "Optical Flow Recognition From the Power Spectrum of a Single Blurred Image", In Proceedings of 3rd IEEE International Conference on Image Processing, vol. 3, Sep. 16, 1996, pp. 791-794.

\* cited by examiner

SYSTEMS AND METHODS FOR MOTION ADAPTIVE FILTERING AS PRE-PROCESS TO VIDEO ENCODING

BACKGROUND

Background and Relevant Art

A Graphics Processing Unit (GPU), a central processing unit (CPU), or other computing device renders a set of pictures to be viewed as a video. This video may be compressed into a bitstream for streaming to a remote device for viewing in real-time, stored for later viewing, uploaded to a server for viewing on demand, etc.

Many games or other software applications are rendered at either 1080p60 (i.e. 1920×1080 at 60 frames per second (fps)) or Ultra High Definition (UHD) (3840×2160 at 60 fps) resolution. The rendering is either standard dynamic range (SDR) (e.g., pixels are 8-bit per component) or high dynamic range (HDR) (e.g., 10-bit per component), and the rendering is conventionally in RGB color space. The raw video bandwidth is between 373 MB/s and 2 GB/s. Typically, video is compressed to between 1-2 Mbps for 720p to 20-30 Mbps for UHD. Conventional video compression techniques produce graphical artifacts in the video when displayed to a user.

BRIEF SUMMARY

In some embodiments, a method of providing visual information to a user includes receiving a first frame having a first resolution, downscaling the first frame to a second resolution, the second resolution being lower resolution than the first resolution, receiving a second frame having the first resolution, downscaling the second frame to the second resolution, comparing the first frame at the second resolution to the second frame at the second resolution to create a second resolution motion vector field, seeding a seeded first resolution motion vector field, comparing the first frame at the first resolution to the second frame at the first resolution to refine the seeded first resolution motion vector field to create a refined first resolution motion vector field, and applying a blur filter to the first frame at the first resolution based on the refined first resolution motion vector field to create a filtered first frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to devices, systems, and methods for applying a blur filter to graphical frames based on motion of objects and textures between the graphical frames. A blur filter is applied to graphical frames to simulate motion blur experienced by the human eye. When the human eye views objects, it integrates the incident light over a period of time. Objects in motion, therefore, appear to be blurred in the direction of motion. In some embodiments, systems and methods according to the present disclosure compare at least a first graphical frame to a second graphical frame to correlate edges, textures, and objects between the two frames to calculate a motion vector field. Some objects or areas of the frame may move more or less than other areas, and calculation of a motion vector field allows the blur filter to adapt to the relative motion of different edges, textures, and objects in the field of view of the frames.

While the present disclosure refers to the example of graphical frames rendered for an automotive driving simulation, it should be understood that the described systems and methods may be applicable to any rendered or accessed series of graphical frames. For example, the series of graphical frames may be rendered by a computing device in real time. In some examples, the series of graphical frames may be pre-rendered or pre-recorded, and the pre-rendered or pre-recorded series of graphical frames may be accessed by the computing device with the blur filter being applied to the pre-rendered or pre-recorded series of frames.

Figure 1:
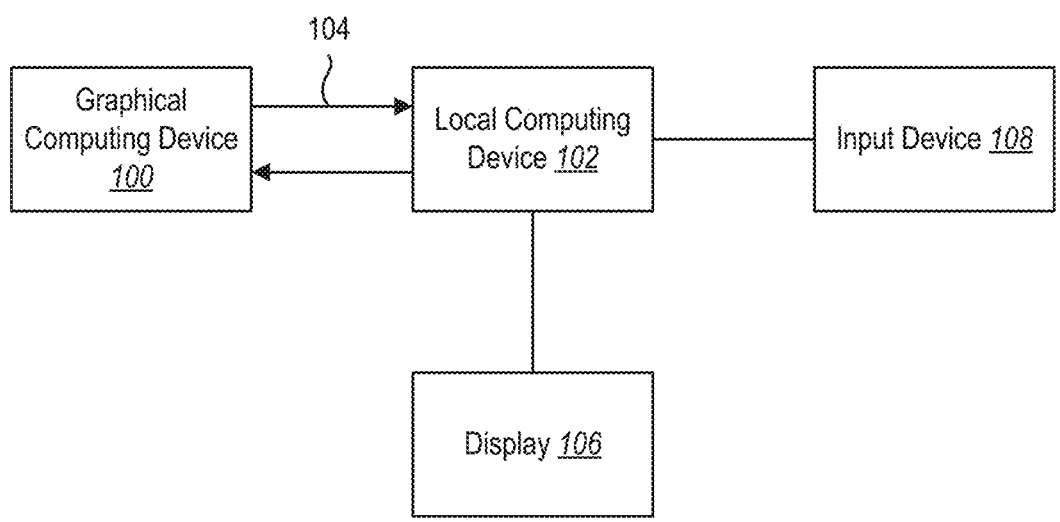
FIG. 1 is a system diagram of a remote computing device and a local computing device in communication via a network, according to at least one embodiment of the present disclosure.

Referring now to FIG. 1, in some embodiments, a graphical computing device 100 renders a plurality of sequential graphical frames for presentation to a user. In some embodiments, the graphical computing device is local to the user, such as a desktop computer, hybrid computer, a laptop computer, handheld computing device, or entertainment console (e.g., MICROSOFT XBOX, NINTENDO SWITCH, SONY PLAYSTATION).

In some embodiments, the graphical computing device 100 is a remote computing device that renders or accesses the series of graphical frames and applies a motion-adaptive blur filter, as described herein. In such embodiments, the remote computing device then transmits the blur-filtered frames to a local computing device 102 local to the user via a network 104. The local computing device 102 may have a display 106, which displays the graphical frames to a user, and/or an input device 108, which receives input from the user to send input commands to the remote graphical computing device. The graphical computing device 100 can then render additional graphical frames, at least partially, in response to the user input commands.

In some embodiments, the video is rendered in real-time at the graphical computing device 100 as the user provides input commands via the input device 108 to interact with the video that is displayed at the local display 106. In some embodiments, the local computing device 102 is located remotely from the user, as well, and only the local display 106 and/or the input device 108 are present at the user location. In other embodiments, the graphical computing device 100 and a portion of the local computing device 102 or processes performed by the local computing device 102 are located remotely from the user while a portion of the local computing device 102 or processes performed by the local computing device 102 are local to the user.

There are a number of challenges associated with performing the video encoding. In some embodiments, to limit bandwidth requirements, the rendered video is compressed and sent to the local computing device 102 over the network 104. The video is then decompressed on local computing device 102 at the user location and displayed to the user. Conventional compression techniques can produce undesired artifacts in the video.

Figure 2:
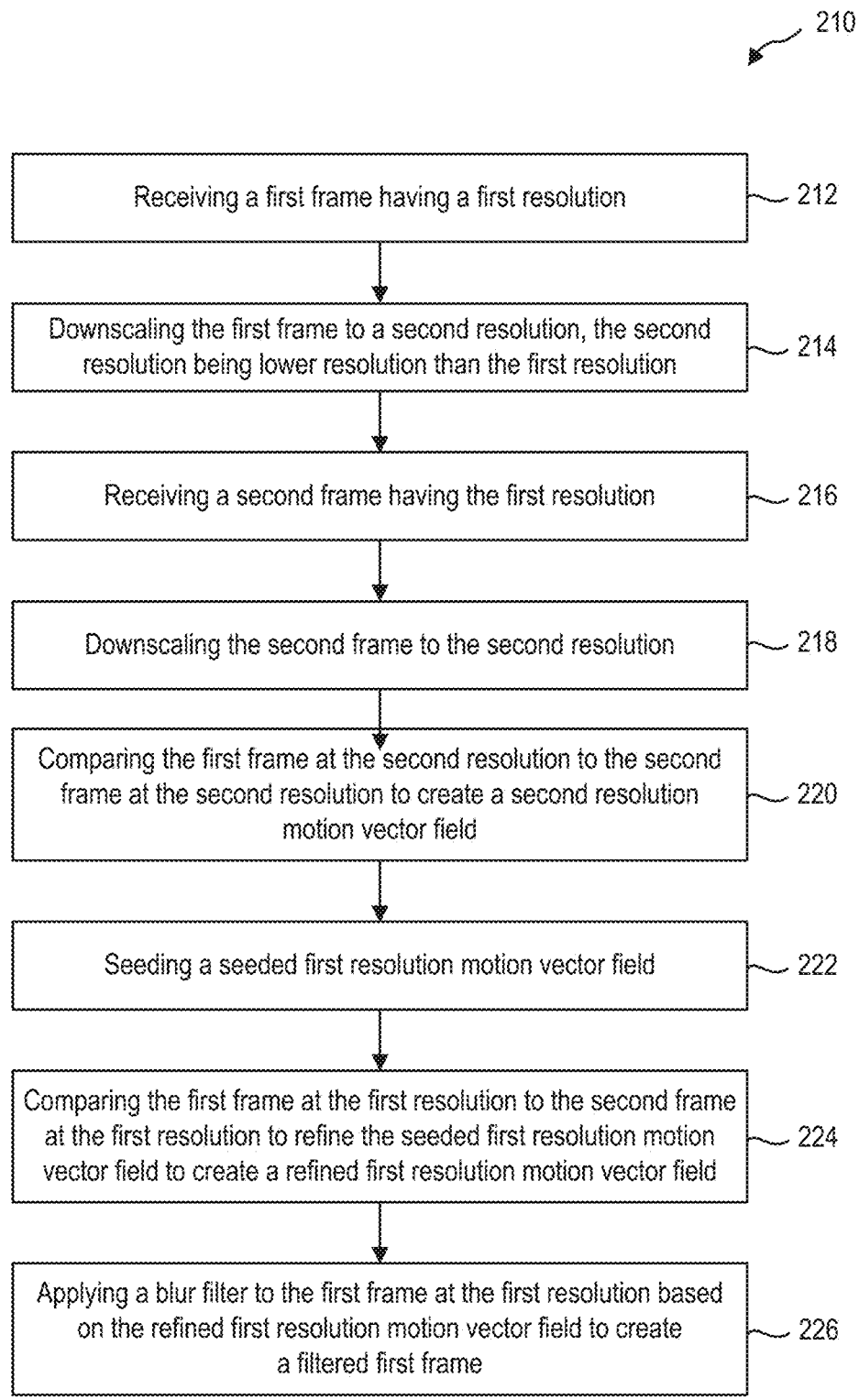
FIG. 2 is a flowchart illustrating a method of motion adaptive blur filtering, according to at least one embodiment of the present disclosure.

A method 210 of applying a blur filter to graphical frames according to the present disclosure is shown in FIG. 2 and includes receiving (212) a first frame having a first resolution at a graphical computing device. In some embodiments, receiving the first frame includes rendering the first frame. In some embodiments, receiving the first frame includes accessing the first frame from a local hardware storage device. In some embodiments, the hardware storage device is a non-transient storage device including any of RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer. In some embodiments, receiving the first frame includes accessing the first frame from a remote storage via a network, such as from a cloud-based storage device.

Modern software applications render graphical frames in high resolutions, such as 1920×1080 at 60 frames per second (e.g., "High Definition", 1080p60, 3840×2160 at 60 frames per second (e.g., "Ultra High Definition" or "4K resolution"), 8K resolution, or greater. Comparing the edges, textures, and objects between frames at high resolutions, such as 1080p60, 4K resolution, or 8K resolution, is time- and computing resource-intensive. In some embodiments, the method includes downscaling (214) the first frame from the first resolution to a second resolution that is lower than the first. For example, the first resolution is 4K resolution, and the second resolution is 1080p. In another example, the first resolution is 1920×1080 pixels and the second resolution is 960×540 pixels. In another example, the first resolution is 8K resolution and the second resolution is 4K resolution.

The method further includes receiving (216) a second frame having the first resolution. In some embodiments, receiving the second frame includes rendering the second frame. In some embodiments, receiving the second frame includes accessing the second frame from a local hardware storage device. In some embodiments, receiving the second frame includes accessing the second frame from a remote storage via a network.

The second frame is downscaled (218) from the first resolution to the second resolution. In some embodiments, the method further includes downscaling the first frame at the second resolution a second time to a third resolution. For example, the first frame and second frame may each be downscaled from the first resolution to the second resolution and, also, downscaled to the third resolution. In some embodiments, the first resolution is 4K resolution, the second resolution is 1080 resolution, and the third resolution is 960×540 resolution. In some embodiments, the first resolution is 8K resolution, the second resolution is 4K resolution, and the third resolution is 1080 resolution. In some embodiments, the first resolution has a 1080 vertical resolution, the second resolution has a 540 vertical resolution, and the third resolution has a 270 vertical resolution.

In embodiments with at least one downscaling, the method includes comparing (220) the first frame at the second resolution to the second frame at the second resolution to create a second resolution motion vector field. In some embodiments, the comparison between the first frame and second frame is performed according the present disclosure, while other image correlation and motion detection methods or algorithms are possible.

In some embodiments, comparing the first frame to the second frame includes comparing a first plurality of blocks of pixels of the first frame to a second plurality of blocks of pixels of the second frame. For example, the plurality of blocks may be a tessellation of the frame, where a block includes a rectangle of pixels in a rectangular frame. In some examples, the blocks are square blocks that are 2×2 pixels, 4×4 pixels, 8×8 pixels, 16×16 pixels, 32×32 pixels, 64×64 pixels, or 128×128 pixels. The smaller the blocks, the higher resolution the motion vector field, but the more difficult the image correlation and/or motion detection between frames.

In at least one example, the blocks are at least 8×8 pixels when the second resolution is 540 vertical pixels, at least 16×16 when the second resolution is 1080 vertical pixels, and at least 32×32 when the second resolution is 2160 vertical pixels. In some embodiments, the blocks have a vertical dimension that is at least 6.75% of the vertical resolution of the second resolution.

In some embodiments, the method further comprises seeding (222) a seeded first resolution motion vector field with the motion vectors of the second resolution motion vector field. Seeding the first resolution motion vector field includes scaling the vector magnitude for the difference between the second resolution and first resolution (e.g., if the first resolution is double the first resolution, the magnitude of the motion vectors is doubled prior to seeding) and each block seeds four blocks at the higher resolution (e.g., the block size remains the same based on the lowest resolution used). The seeded first resolution motion vector field, therefore, contains blocks having the motion vector data of the second resolution motion vector field.

Using the seeded first resolution motion vector field as a baseline, the method then includes comparing (224) the first frame at the first resolution to the second frame at the first resolution to refine the seeded first resolution motion vector field to create a refined first resolution motion vector field.

In embodiments with two levels of downscaling, the method includes comparing the first frame at the third resolution to the second frame at the third resolution to create a third resolution motion vector field. The third resolution motion vector field may be used to seed a seeded second resolution motion vector field. Using the seeded second resolution motion vector field as a baseline, the first frame at the second resolution is compared to the second frame at the second resolution to refine the seeded second resolution motion vector field and create a refined second resolution motion vector field. The refined second resolution motion vector field may be used to seed a seeded first resolution motion vector field. Using the seeded first resolution motion vector field as a baseline, the method then includes comparing the first frame at the first resolution to the second frame at the first resolution to refine the seeded first resolution motion vector field to create a refined first resolution motion vector field.

Finally, in some embodiments, the method includes applying (226) a blur filter to the first frame at the first resolution based on the refined first resolution motion vector field to create a filtered first frame. In some embodiments, the filtered first frame is subsequently displayed to a user on a display. In some embodiments, the filtered first frame is subsequently transmitted to a local computing device local to a user via a network, and the filtered first frame is displayed to the user on a display of the local computing device.

In some embodiments, the GPU and/or CPU of the graphical computing device renders a first frame in a first resolution in a first color space. For example, the first resolution may be 1080 resolution, 4K resolution, 8K resolution, or other resolution. In some embodiments, the first color space is red-green-blue (RGB), red-green-blue-black (RGBK), yellow-cyan-magenta (YCM), yellow-cyan-magenta-black (YCMK), luma-chrominance blue-chrominance red (YCbCr), luma-chrominance orange-chrominance green (YCoCg), or another color space. While a method according to the present disclosure is applicable to any color space, in some embodiments, the first color space is converted to the YCbCr color space to reduce artifacts in subsequent video compression or encoding.

Figure 3:
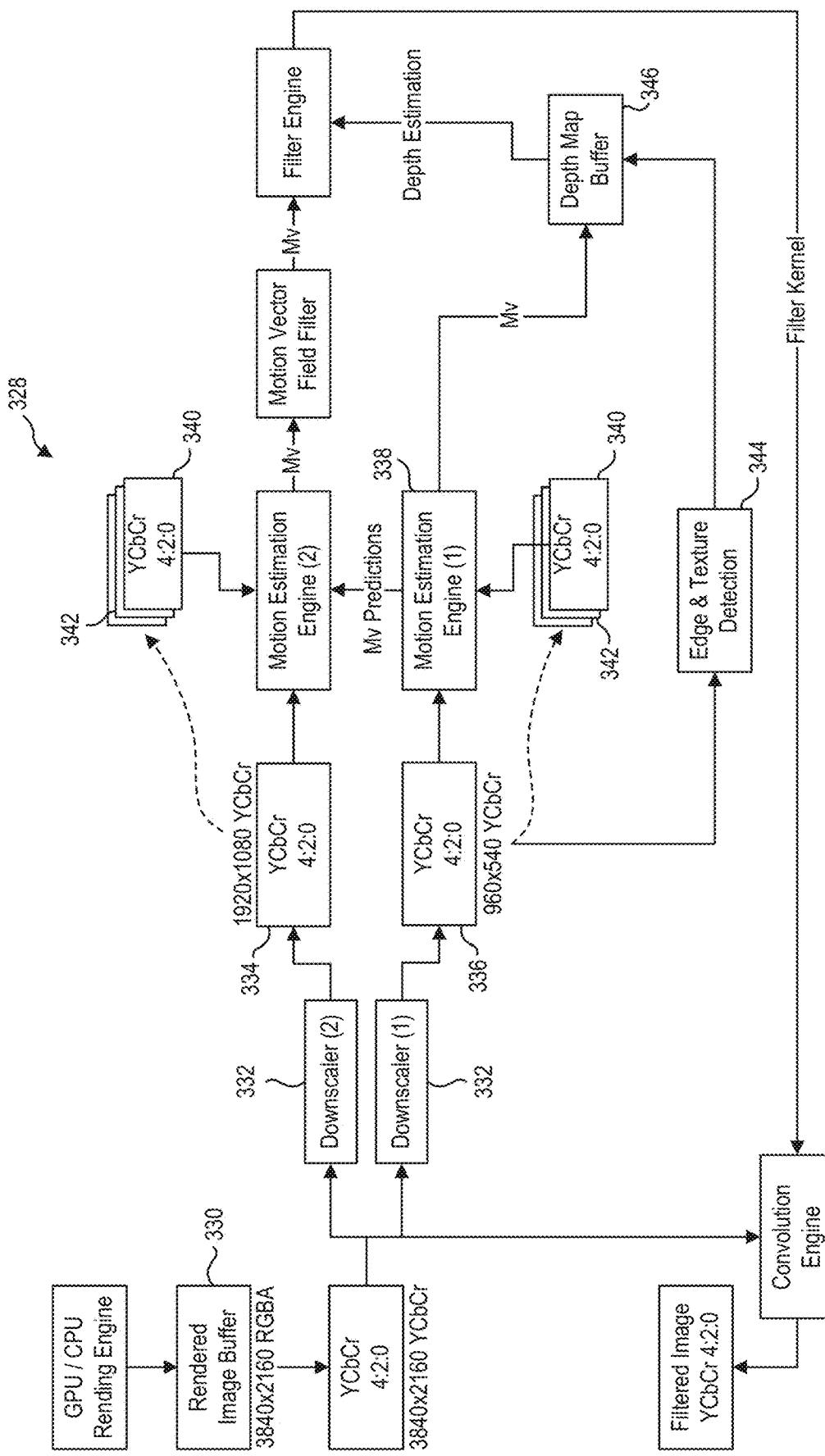
FIG. 3 is a flowchart illustrating another method of motion adaptive blur filtering, according to at least one embodiment of the present disclosure.

FIG. 3 illustrates a flowchart 328 of an embodiment of a method of motion-adaptive filtering, according to the present disclosure. In some embodiments, the rendered frames 330 are provided to a memory of the graphical computing device, and the graphical computing device downscales 332 the original frame at the first resolution to scaled pictures at the second resolution 334 and, in some embodiments, the third resolution 336. After the first frame is downscaled to create a stack of versions of the first frame at the first resolution, second resolution, or more, the motion estimation engine 338 compares the equivalent resolutions of the first frame stack 340 against the second frame stack 342.

In some embodiments, the graphical computing device further applies an edge and texture detection algorithm 344 to calculate a depth map 346 of the first frame. In some embodiments, calculating the depth map 346 includes using one or more of linear perspective depth cues, overlapping depth cue (e.g., occlusion), texture gradients, relative sizes of objects, or motion parallax between the first frame and second frame.

In some embodiments, linear perspective depth cues include detecting parallel lines that converge at a distance. When convergent lines are present and detected in the frame, the convergent lines provide a scalable depth approximation and a horizon approximation for the frame. By evaluating objects within the space defined by the converging parallel lines, the graphical computing device can determine relative depth of the objects.

In some embodiments, overlapping depth cues can be measured by detecting objects that occlude one another. Based on the superposition of the occluding objects, relative depth of the objects can be determined.

In some embodiments, texture gradients can be used to approximate depth when the texture gradients are approximately regular. For example, the texture gradient of floor tiles in a rendered environment provide a regular texture gradient that recedes from the viewer. The regular texture gradient can therefore allow the depth of the rendered environment to be determined.

In some embodiments, relative size of similar objects or textures can be used to determine relative depth in the rendered environment. Similar to the regular texture gradients, similar objects or textures can indicate depth. In a particular example, a frame includes a garden with a number of turtles of approximately the same size. Some of the turtles may appear to be the same size and hence similar distance away from the viewer. Another turtle occupies a smaller space, but because of its position in the frame (i.e., closer to the horizon determined by parallel converging lines), it is smaller but is determined to be further away, and hence appears as same actual size to others. But another, is nearer (i.e., in the foreground) but appears as same size as the turtle closer the horizon, and hence the foreground turtle is determined to be smaller than the others, providing relative depth information.

Motion parallax may be used in embodiments with a second frame available for comparison. While binocular parallax is not possible to calculate depth using a single frame, motion parallax between frames can be used to calculate depth. In some embodiments where displacement of the viewing position between the first frame and second frame is known, absolute depth may be calculated based on the parallax with a known baseline between viewing angles.

Figure 4:
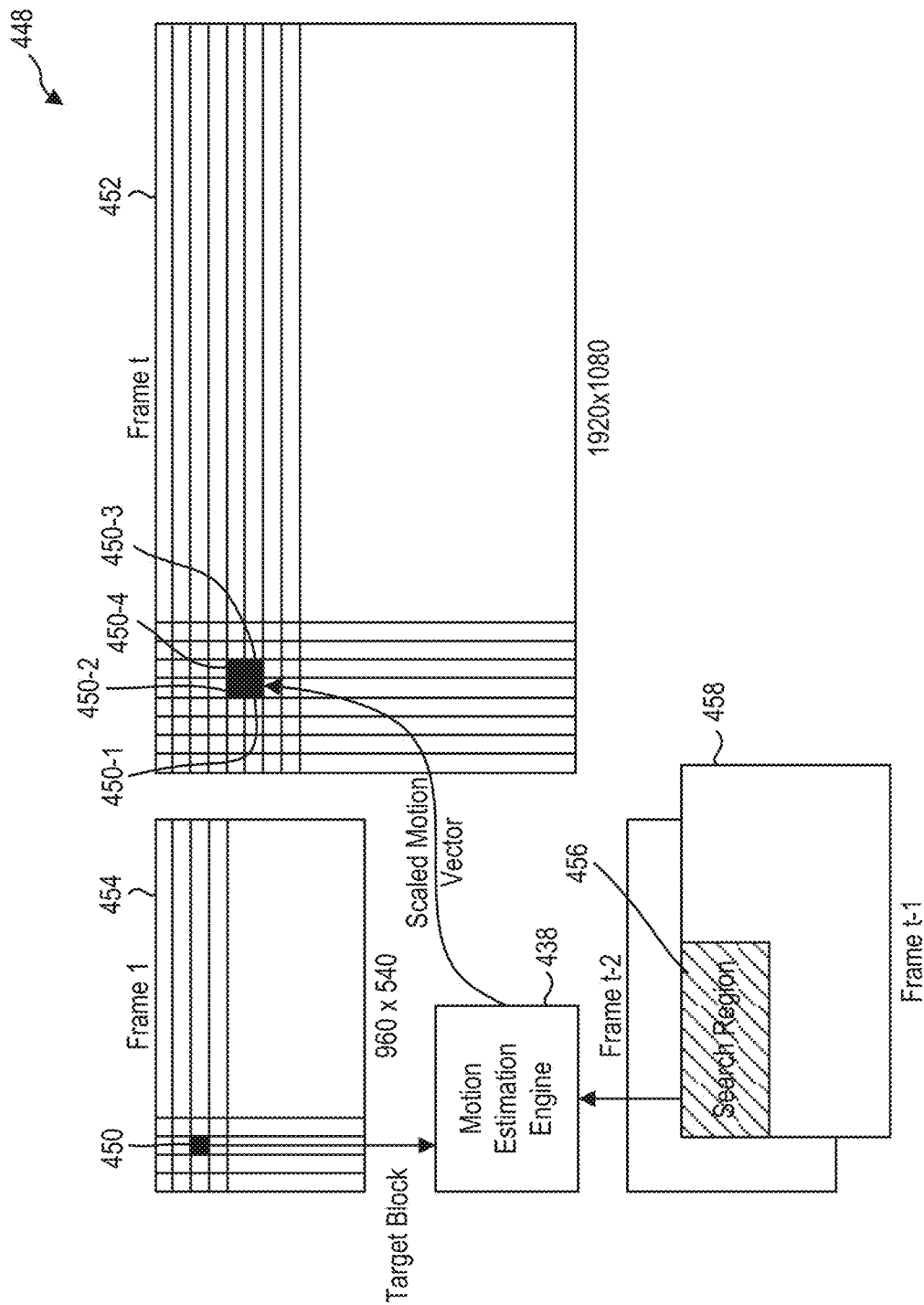
FIG. 4 is a schematic representation of decomposing a frame into blocks at different resolutions, according to at least one embodiment of the present disclosure.

FIG. 4 illustrates a frame 448 broken down into constituent blocks 450 in a first resolution frame 452 and a second resolution frame 450. In some embodiments, calculating the motion vector field may start with the lowest resolution images, for example (960×540) of the first frame and the second frame. In some embodiments, only the luma channel is used to reduce processing requirements, as the motion vectors may be calculated from grayscale values only. In some embodiments, the full color space is used. Frame [t] is subdivided into non-overlapping blocks 450 of size 8×8 (can also use 16×16 blocks). For one such block 450 $B_i$ in [t], the graphical computing device may use edge detection, texture detection, object detection, or combinations thereof to locate a corresponding block $B_{i,st}'$ in [t−1], where uv is the corresponding displacement (or motion vector) to the matched block. The graphical computing device searches with the motion estimation engine 438 in a region 456 of the previous frame [t−1] 458 for the Block $B_i$ in the current frame [t] and defines goodness of match between the blocks by computing either the sum of absolute difference or sum of squared difference D(s,t) according to:

$$D(s, t) = \sum_{u=0}^{U-1} \sum_{v=0}^{V-1} |B[u, v] - B'[u + s, v + t]|^2$$

The location of the matching block (s,t) is the motion vector. Because of noisy data, an unconstrained search may find local minima. The search and selection of the matching block may be improved by adding some constraints. These constraints include, for example, that a moving camera leads to an imposition of a global motion for all objects in the frame; and, locally, that motion is expected to be coherent due to large objects span across multiple objects and that rigid objects move coherently. Either way, neighboring blocks are expected to have similar motion. Since blocks can be noisy, we can observe perturbation in the motion field (even if there is a single global motion imposed). To combat this, we can add an annealing term; minimizing for J(s,t): according to.

$$J(s,t)=D(s,t)+\lambda \times (|mvp\_x-s|+|mvp\_y-t|)$$

In other embodiments, the process uses other measures for determining similarities between two blocks such as using variations on structured similarities measurements. Because most motion in a scene is spatially coherent, in some embodiments, computation of the motion vector for a block that is neighboring other blocks (for which the graphical computing device has already computed motion vectors) can be constrained by the computed motion vectors of those neighboring blocks. Additionally, because the motion of the scene is most likely temporally coherent, the motion vector for that block of the previous frame may be used to constrain the motion vector calculation of the block of the current frame. In some embodiments, the method includes performing a search around each of the three initial candidates as seeds, and find any matches using the above annealing process. The potential matches are then evaluated to find the best candidate based on similarity of matching blocks and coherent motion of surrounding blocks. A scene change breaks this spatio-temporal coherence, however, scene change frames provide no coherent motion, and thus no blur filter is applied during a scene change.

The search process begins by determining:
1. J(0, 0), i.e., assuming no motion
2. J(mvp_s,mvp_t)
3. J(global_s, global_t)

Where (mvp_s,mvp_t) is the predicted motion vector derived from the motion of the neighboring blocks (e.g., (mvp_s,mvp_t)=median(spatially and temporally neighboring blocks), and where (global_s,global_t) is the global motion vector (derived from a previous frame). The global motion vector is computed by determining the statistical mode motion vector for all the blocks in [t−1]. In some embodiments, the global motion vector is calculated by histogramming the motion vectors of the previous frame and finding the largest bin after filtering.

Initially, the method includes searching the three locations described above to constrain the search. The position which has the smallest cost J(s,t), the method may use as seed for further search and refinement. Once the motion vector with the best goodness of fit has been found, the motion vector is stored in a table or list. In some embodiments, once the motion vector for the next Q+1 blocks have been found (where Q is the numbers of blocks in a row), the graphical computing device applies a median filter to smooth the motion field using neighboring motion vectors and determine the motion vector for the given block B.

Figure 5:
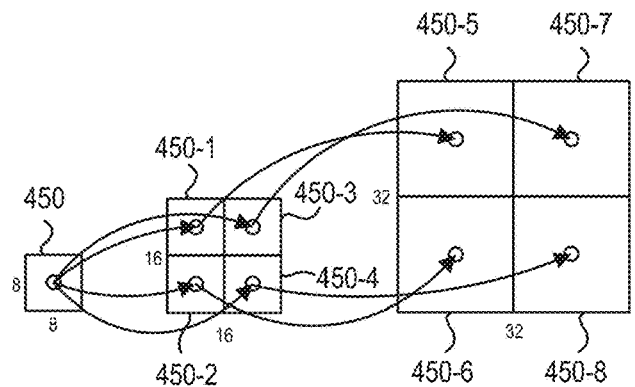
FIG. 5 is a schematic representation of seeding blocks of a frame at different resolutions, according to at least one embodiment of the present disclosure.

In some embodiments, the motion vector field is used to seed equivalent sized blocks 450-1, 450-2, 450-3, 450-4 at a higher resolution. In some embodiments, the motion vector field is then refined by the search and calculations described herein to create a motion vector field having a greater block size to maintain the same number of blocks in a frame between resolutions. For example, once the search has been performed for a given block 450 at the lowest resolution image 454, the method uses the calculated motion vector to seed search in the next higher resolution 452. The motion vector (s,t), is scaled such that it is (scale×s,scale×t). In some embodiments, the scale value is the same as the scaling between the two resolutions. For example, if the lower resolution 454 is 960×540 pixels and next resolution 452 is 1920×1080, the scaling factor is 2, and the motion vector (s,t) is scaled to (2×s,2×t). Referring now to FIG. 5, an 8×8 pixel block 450 on the lower resolution maps to a 16×16 block at the next layer. In some embodiments, the 16×16 block is subdivided into four 8×8 blocks 450-1, 450-2, 450-3, 450-4, where each of the 8×8 blocks 450-1, 450-2, 450-3, 450-4 use the same seed vector. Small region search is performed at this next layer to find a better, refined match. This updated motion vector is mapped to the blocks 450-5, 450-6, 450-7, 450-8 in the next highest resolution map.

Figure 6:
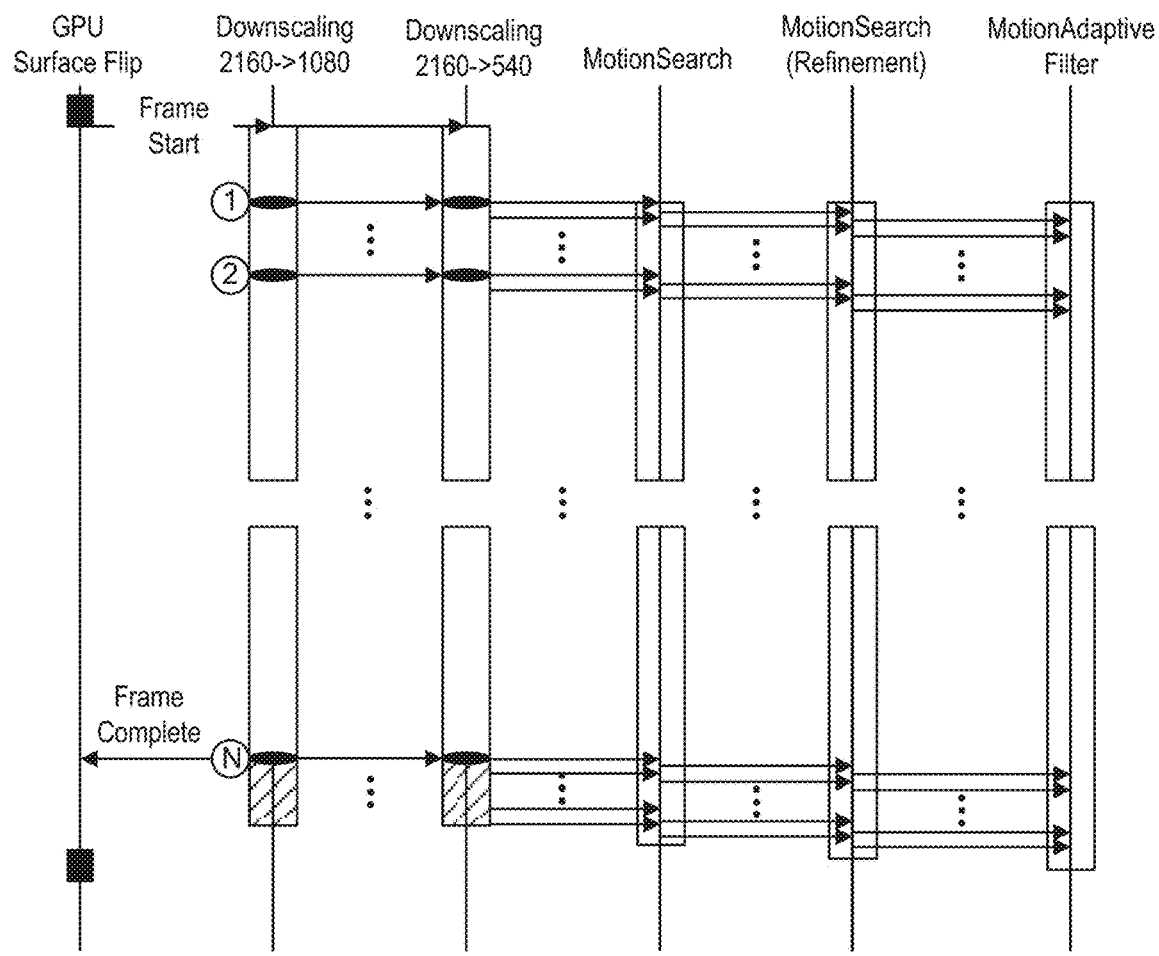
FIG. 6 is a graph illustrating processing timing of a method of motion adaptive blur filtering, according to at least one embodiment of the present disclosure.

FIG. 6 illustrates an example timing for the calculations described herein. In some embodiments, the calculations for each level of resolution can be performed in parallel threads. For example, after downscaling, the first frame and second frame, the lowest resolution (e.g., the third resolution) pictures in the stack can be compared to one another with the graphical computing device performing a search to calculate motion vectors for each block. In some examples, a GPU or dedicated hardware block performs the motion search, and a programmable engine selects the best matching block to generate a list of candidate matches. In some embodiments, the method includes calculating a motion vector field for a third resolution of the first frame and a second frame. The graphical computing device can then seed the next resolution level (e.g., the seeded second resolution vector field) while beginning to calculate a third resolution motion vector field for the second frame and a third frame.

In some embodiments, the third resolution motion vector field for the second frame and the third frame is calculated at least partially at the same time as the refined second motion vector field of the first frame and the second frame. In some embodiments, the third resolution motion vector field for the third frame and a fourth frame is calculated at least partially at the same time as the refined second motion vector field of the second frame and the third frame, which is calculated at least partially at the same time as the refined first resolution vector field of the first frame and second frame. By overlapping the calculations, the delay in filtering and displaying the graphical frame may be minimized.

In some embodiments, different regions of the first frame and second frame exhibit different motion vectors. In some embodiments, some blocks or regions of a first frame and a second frame exhibit approximately zero motion between the two frames. For example, in a driving simulation, the camera view may be focused on the car the user is controlling. The car may exhibit relatively little movement between frames when the vehicle is moving in a straight line, and the motion vectors associated with the rendering of the vehicle may have approximately zero magnitude. The road and surrounding environment near the vehicle, however, may exhibit motion vectors with high magnitudes. When the vehicle is turning in the described reference frame, the vehicle may rotate in the field of view, exhibiting motion vectors with orientations that are different from the motion vector field describing the environment.

Figure 7:
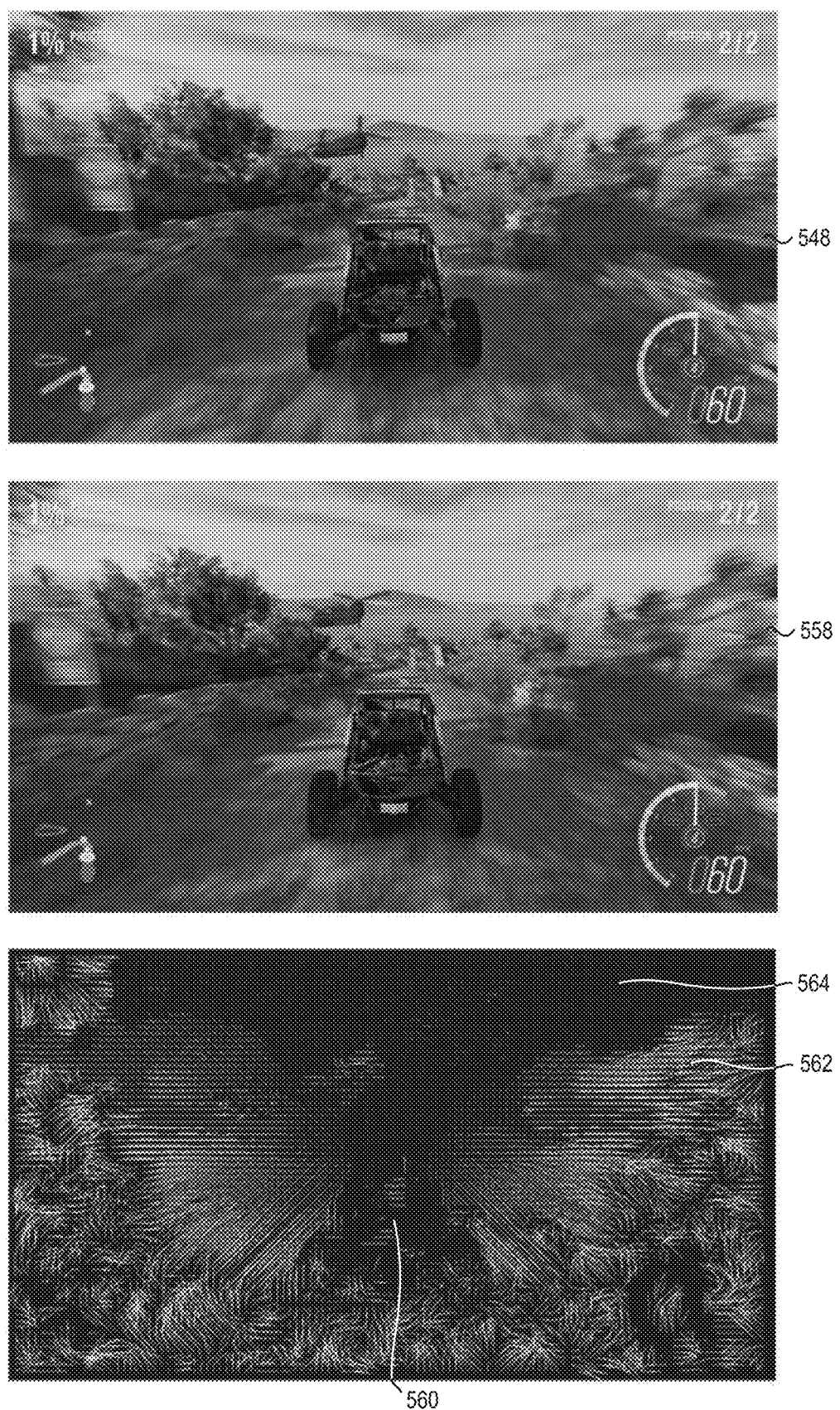
FIG. 7 is an example of a first frame, a second frame, and a resulting motion vector field, according to at least one embodiment of the present disclosure.

FIG. 7 illustrates an example motion vector field calculated from a first frame 548 and a second frame 558. In some embodiments, the surrounding environment of the vehicle 560 while moving may exhibit a high degree of movement while objects further toward the horizon 562 or in the sky 564 (e.g., having a greater depth value) exhibit relatively little or no motion. In some embodiments, the depth map is used to refine the vector motion field by scaling the motion vector based on the depth of an object. In some embodiments, the blur filter is only applied to regions, objects, blocks, or pixels of the frame when the motion vector has a magnitude above a threshold value. For example, the sky of the frames shows little to no movement. In some embodiments, the graphical computing device only applies the blur filter to the road, vehicle, and surrounding objects and does not apply the blur filter to the sky, reducing the computational demands.

In some embodiments, the threshold value is a percentage of the maximum calculated vector magnitude in the refined first resolution motion vector field. For example, the graphical computing device may apply the blur filter to only regions, objects, blocks, or pixels that exhibit at least 2% of the maximum calculated vector magnitude of the refined first resolution motion vector field. In some embodiments, the graphical computing device may apply the blur filter to only regions, objects, blocks, or pixels that exhibit at least 5% of the maximum calculated vector magnitude. In some embodiments, the graphical computing device may apply the blur filter to only regions, objects, blocks, or pixels that exhibit at least 10% of the maximum calculated vector magnitude. Because those regions, objects, blocks, or pixels show relatively little speed of movement, the viewer expects those regions, objects, blocks, or pixels to exhibit less blur, and therefore, the system can save resources by not applying the blur filter without the user perceiving unexpected visuals. In some embodiments, those regions, objects, blocks, or pixels with a motion vector magnitude less than the threshold value are less likely to exhibit artifacts during compression or encoding, and the application of the blur filter is less important to the visual quality after compression or encoding.

The blur filter is applied to each region, object, block, or pixel based on the direction and magnitude of the motion vector at that point in the frame. For example, once a refined motion vector is calculated for a block in the first frame at the first resolution (e.g., the original, highest resolution), the blur filter can be applied to the pixels of the block. In some embodiments, the motion vector, as calculated, has a large range of possible values for magnitude and orientation. To accommodate all these potential filters, a large number of filter kernels is needed, or the filter has to be adaptive and computationally heavy. Fine granularity in the selection of the filter is not necessary; in a moving scene, a few degrees error in filter direction or area covered is not discernable to a viewer.

Figure 8:
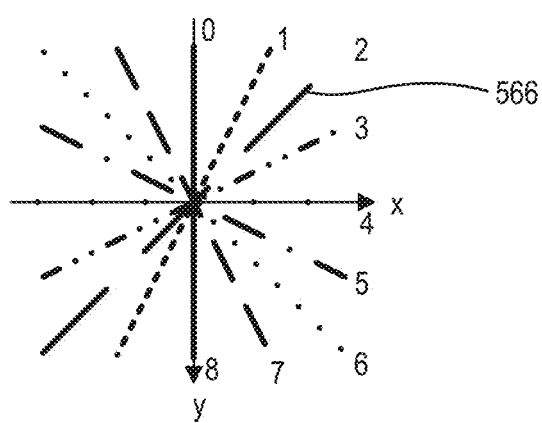
FIG. 8 is a schematic representation of quantization of motion vector orientation, according to at least one embodiment of the present disclosure.

In some embodiments, the motion vector is quantized into one of a fixed set of orientations and one of a fixed set of magnitudes. In some examples, the motion vector orientation is quantized into one of 4, 6, 8, 10, 12, 16, or 24 directions. Referring now to FIG. 8, in a particular example, the motion vector orientation is quantized into one of 8 orientations 566 that are positioned at 22.5° angular intervals (e.g., 0°, 22.5°, 45°, 77.5°, 90°, 112.5°, 135°, and 157.5°). In some embodiments, for the purposes of a blur filter, 0° and 180° are equivalent values and the blur filter is applied the same to the motion of an object moving up or down.

In some embodiments, the blur filter is applied in a kernel. In a particular example, the kernel size is limited to three, quantized such as to indicate "slow", "medium" and "fast" speed. Further, the kernel can be simplified using a single kernel size. Therefore, in some embodiments, the motion vector is quantized such that one of 24 filters is chosen for a given motion vector. Experiments conducted by the inventor have shown that the filter can be limited to a one-dimensional filter oriented along one of the quantized directions. The 1-dimensional filter is not purely horizontal or vertical, but may be aligned to the orientation of the motion vector. The one-dimensional filter may then be translated to a 2D convolution filter kernel. In some embodiments, the kernel is further simplified by using a Gaussian weighting along 5-taps. In a particular example a set of three kernels includes:

"slow": [6 32 52 32 6]
"medium": [20 28 32 28 20]
"fast": [23 27 28 27 23]

In some embodiments, he convolution operation is defined as $$O(p) = \frac{1}{\Sigma w} \sum_{i=-2}^{2} w_i \times I(p+i)$$

where O(p) is the output value at point p, I(p+i) is the input sample at (p+i), and $w_i$ are the blur filter coefficients presented above. The output is normalized by dividing by the sum of the coefficient values. The weights are further chosen to avoid a divide. In some embodiments, the weights sum to 128, thus the "divide" can be performed by an arithmetic shift right operation. In some embodiments, the kernel is divisible by 64 or 32.

In some embodiments, a motion-adaptive blur filter according to the present disclosure allows for a lower resource requirement from the graphical computing device and can avoid some of the artifacts present in the frames when using conventional video compression or encoding. In at least some embodiments, the methods and systems described herein allow for better quality images and/or video with less computational resources and less bandwidth to transmit the images and/or video.

INDUSTRIAL APPLICABILITY

The present disclosure relates generally to systems and methods for applying a blur filter to graphical frames based on motion of objects and textures between the graphical frames. A blur filter is applied to graphical frames to simulate motion blur experienced by the human eye. When the human eye views objects, it integrates the incident light over a period of time. Objects in motion, therefore, appear to be blurred in the direction of motion. In some embodiments, systems and methods according to the present disclosure compare at least a first graphical frame to a second graphical frame to correlate edges, textures, and objects between the two frames to calculate a motion vector field. Some objects or areas of the frame may move more or less than other areas, and calculation of a motion vector field allows the blur filter to adapt to the relative motion of different edges, textures, and objects in the field of view of the frames.

While the present disclosure refers to the example of graphical frames rendered for an automotive driving simulation, it should be understood that the described systems and methods may be applicable to any rendered or accessed series of graphical frames. For example, the series of graphical frames may be rendered by a computing device in real time. In some examples, the series of graphical frames may be pre-rendered or pre-recorded, and the pre-rendered or pre-recorded series of graphical frames may be accessed by the computing device with the blur filter being applied to the pre-rendered or pre-recorded series of frames.

In some embodiments, a graphical computing device renders a plurality of sequential graphical frames for presentation to a user. In some embodiments, the graphical computing device is local to the user, such as a desktop computer, hybrid computer, a laptop computer, handheld computing device, or entertainment console (e.g., MICROSOFT XBOX, NINTENDO SWITCH, SONY PLAYSTATION).

In some embodiments, the graphical computing device is a remote computing device that renders or accesses the series of graphical frames and applies a motion-adaptive blur filter, as described herein. In such embodiments, the remote computing device then transmits the blur-filtered frames to a local computing device local to the user via a network. The local computing device may have a display, which displays the graphical frames to a user and/or an input device, which receives input from the user to send input commands to the remote graphical computing device. The graphical computing device can then render additional graphical frames, at least partially, in response to the user input commands.

A method of applying a blur filter to graphical frames according to the present disclosure includes receiving a first frame having a first resolution with a graphical computing device. In some embodiments, receiving the first frame includes rendering the first frame. In some embodiments, receiving the first frame includes accessing the first frame from a local hardware storage device. In some embodiments, the hardware storage device is a non-transient storage device including any of RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer. In some embodiments, receiving the first frame includes accessing the first frame from a remote storage via a network, such as from a cloud-based storage device.

Modern software applications render graphical frames in high resolutions, such as 1920×1080 at 60 frames per second (e.g., "High Definition", 1080p60, 3840×2160 at 60 frames per second (e.g., "Ultra High Definition" or "4K resolution"), 8K resolution, or greater. Comparing the edges, textures, and objects between frames at high resolutions, such as 1080p60, 4K resolution, or 8K resolution, is time- and computing resource-intensive. In some embodiments, the method includes downscaling the first frame from the first resolution to a second resolution that is lower than the first. For example, the first resolution is 4K resolution, and the second resolution is 1080p. In another example, the first resolution is 1920×1080 pixels and the second resolution is 960×540 pixels. In another example, the first resolution is 8K resolution and the second resolution is 4K resolution.

The method further includes receiving a second frame having the first resolution. In some embodiments, receiving the second frame includes rendering the second frame. In some embodiments, receiving the second frame includes accessing the second frame from a local hardware storage device. In some embodiments, receiving the second frame includes accessing the second frame from a remote storage via a network.

The second frame is downscaled from the first resolution to the second resolution. In some embodiments, the method further includes downscaling the first frame at the second resolution a second time to a third resolution. For example, the first frame and second frame may each be downscaled from the first resolution to the second resolution and, also, downscaled to the third resolution. In some embodiments, the first resolution is 4K resolution, the second resolution is 1080 resolution, and the third resolution is 960×540 resolution. In some embodiments, the first resolution is 8K resolution, the second resolution is 4K resolution, and the third resolution is 1080 resolution. In some embodiments, the first resolution has a 1080 vertical resolution, the second resolution has a 540 vertical resolution, and the third resolution has a 270 vertical resolution.

In embodiments with at least one downscaling, the method includes comparing the first frame at the second resolution to the second frame at the second resolution to create a second resolution motion vector field. In some embodiments, the comparison between the first frame and second frame is performed according the present disclosure, while other image correlation and motion detection methods or algorithms are possible.

In some embodiments, comparing the first frame to the second frame includes comparing a first plurality of blocks of pixels of the first frame to a second plurality of blocks of pixels of the second frame. For example, the plurality of blocks may be a tessellation of the frame, where a block includes a rectangle of pixels in a rectangular frame. In some examples, the blocks are square blocks that are 2×2 pixels, 4×4 pixels, 8×8 pixels, 16×16 pixels, 32×32 pixels, 64×64 pixels, or 128×128 pixels. The smaller the blocks, the higher resolution the motion vector field, but the more difficult the image correlation and/or motion detection between frames.

In at least one example, the blocks are at least 8×8 pixels when the second resolution is 540 vertical pixels, at least 16×16 when the second resolution is 1080 vertical pixels, and at least 32×32 when the second resolution is 2160 vertical pixels. In some embodiments, the blocks have a vertical dimension that is at least 6.75% of the vertical resolution of the second resolution.

In some embodiments, the method further comprises seeding a seeded first resolution motion vector field with the motion vectors of the second resolution motion vector field. Seeding the first resolution motion vector field includes scaling the vector magnitude for the difference between the second resolution and first resolution (e.g., if the first resolution is double the first resolution, the magnitude of the motion vectors is doubled prior to seeding) and each block seeds four blocks at the higher resolution (e.g., the block size remains the same based on the lowest resolution used). The seeded first resolution motion vector field, therefore, contains blocks having the motion vector data of the second resolution motion vector field.

Using the seeded first resolution motion vector field as a baseline, the method then includes comparing the first frame at the first resolution to the second frame at the first resolution to refine the seeded first resolution motion vector field to create a refined first resolution motion vector field.

In embodiments with two levels of downscaling, the method includes comparing the first frame at the third resolution to the second frame at the third resolution to create a third resolution motion vector field. The third resolution motion vector field may be used to seed a seeded second resolution motion vector field. Using the seeded second resolution motion vector field as a baseline, the first frame at the second resolution is compared to the second frame at the second resolution to refine the seeded second resolution motion vector field and create a refined second resolution motion vector field. The refined second resolution motion vector field may be used to seed a seeded first resolution motion vector field. Using the seeded first resolution motion vector field as a baseline, the method then includes comparing the first frame at the first resolution to the second frame at the first resolution to refine the seeded first resolution motion vector field to create a refined first resolution motion vector field.

Finally, in some embodiments, the method includes applying a blur filter to the first frame at the first resolution based on the refined first resolution motion vector field to create a filtered first frame. In some embodiments, the filtered first frame is subsequently displayed to a user on a display. In some embodiments, the filtered first frame is subsequently transmitted to a local computing device local to a user via a network, and the filtered first frame is displayed to the user on a display of the local computing device.

In some embodiments, the GPU and/or CPU of the graphical computing device renders a first frame in a first resolution in a first color space. For example, the first resolution may be 1080 resolution, 4K resolution, 8K resolution, or other resolution. In some embodiments, the first color space is red-green-blue (RGB), red-green-blue-black (RGBK), yellow-cyan-magenta (YCM), yellow-cyan-magenta-black (YCMK), luma-chrominance blue-chrominance red (YCbCr), luma-chrominance orange-chrominance green (YCoCg), or another color space. While a method according to the present disclosure is applicable to any color space, in some embodiments, the first color space is converted to the YCbCr color space to reduce artifacts in subsequent video compression or encoding.

The rendered frames are provided to a memory of the graphical computing device, and the graphical computing device downscales the original frame at the first resolution to scaled pictures at the second resolution and, in some embodiments, the third resolution. After the first frame is downscaled to create a stack of versions of the first frame at the first resolution, second resolution, or more, the motion estimation engine compares the equivalent resolutions of the first frame stack against the second frame stack.

In some embodiments, the graphical computing device further applies a edge and texture detection algorithm to calculate a depth map of the first frame. In some embodiments, calculating the depth map includes using one or more of linear perspective depth cues, overlapping depth cue (e.g., occlusion), texture gradients, relative sizes of objects, or motion parallax between the first frame and second frame.

In some embodiments, linear perspective depth cues include detecting parallel lines that converge at a distance. When convergent lines are present and detected in the frame, the convergent lines provide a scalable depth approximation and a horizon approximation for the frame. By evaluating objects within the space defined by the converging parallel lines, the graphical computing device can determine relative depth of the objects.

In some embodiments, overlapping depth cues can be measured by detecting objects that occlude one another. Based on the superposition of the occluding objects, relative depth of the objects can be determined.

In some embodiments, texture gradients can be used to approximate depth when the texture gradients are approximately regular. For example, the texture gradient of floor tiles in a rendered environment provide a regular texture gradient that recedes from the viewer. The regular texture gradient can therefore allow the depth of the rendered environment to be determined.

In some embodiments, relative size of similar objects or textures can be used to determine relative depth in the rendered environment. Similar to the regular texture gradients, similar objects or textures can indicate depth. In a particular example, a frame includes a garden with a number of turtles of approximately the same size. Some of the turtles may appear to be the same size and hence similar distance away from the viewer. Another turtle occupies a smaller space, but because of its position in the frame (i.e., closer to the horizon determined by parallel converging lines), it is smaller but is determined to be further away, and hence appears as same actual size to others. But another, is nearer (i.e., in the foreground) but appears as same size as the turtle closer the horizon, and hence the foreground turtle is determined to be smaller than the others, providing relative depth information.

Motion parallax may be used in embodiments with a second frame available for comparison. While binocular parallax is not possible to calculate depth using a single frame, motion parallax between frames can be used to calculate depth. In some embodiments where displacement of the viewing position between the first frame and second frame is known, absolute depth may be calculated based on the parallax with a known baseline between viewing angles.

In some embodiments, calculating the motion vector field may start with the lowest resolution images, for example (960×540) of the first frame and the second frame. In some embodiments, only the luma channel is used to reduce processing requirements, as the motion vectors may be calculated from grayscale values only. In some embodiments, the full color space is used. Frame [t] is subdivided into non-overlapping blocks of size 8×8 (can also use 16×16 blocks). For one such block $B_i$ in [t], the graphical computing device may use edge detection, texture detection, object detection, or combinations thereof to locate a corresponding block $B_{i,st}'$ in [t−1], where uv is the corresponding displacement (or motion vector) to the matched block. The graphical computing device searches in a region of the previous frame [t−1] for the Block $B_i$ in the current frame [t] and defines goodness of match between the blocks by computing either the sum of absolute difference or sum of squared difference D (s,t) according to:

$$D(s,t) = \sum_{u=0}^{U-1} \sum_{v=0}^{V-1} |B[u,v] - B'[u+s, v+t]|^2$$

The location of the matching block (s,t) is the motion vector. Because of noisy data, an unconstrained search may find local minima. The search and selection of the matching block may be improved by adding some constraints. These constraints include, for example, that a moving camera leads to an imposition of a global motion for all objects in the frame; and, locally, that motion is expected to be coherent due to large objects span across multiple objects and that rigid objects move coherently. Either way, neighboring blocks are expected to have similar motion. Since blocks can be noisy, we can observe perturbation in the motion field (even if there is a single global motion imposed). To combat this, we can add an annealing term; minimizing for J(s,t): according to.

$$J(s,t)=D(s,t)+\lambda \times (|mvp\_x-s|+|mvp\_y-t|)$$

Because most motion in a scene is spatially coherent, in some embodiments, computation of the motion vector for a block that is neighboring other blocks (for which the graphical computing device has already computed motion vectors) can be constrained by the computed motion vectors of those neighboring blocks. Additionally, because the motion of the scene is most likely temporally coherent, the motion vector for that block of the previous frame may be used to constrain the motion vector calculation of the block of the current frame. A scene change breaks this spatio-temporal coherence, however, scene change frames provide no coherent motion, and thus no blur filter is applied during a scene change.

The search process begins by determining:
4. J(0, 0), i.e., assuming no motion
5. J(mvp_s,mvp_t)
6. J(global_s, global_t)

Where (mvp_s,mvp_t) is the predicted motion vector derived from the motion of the neighboring blocks (e.g., (mvp_s,mvp_t)=median(spatially and temporally neighboring blocks), and where (global_s,global_t) is the global motion vector (derived from a previous frame). The global motion vector is computed by determining the statistical mode motion vector for all the blocks in [t−1]. In some embodiments, the global motion vector is calculated by histogramming the motion vectors of the previous frame and finding the largest bin after filtering.

Initially, the method includes searching the three locations described above to constrain the search. The position which has the smallest cost J(s,t), the method may use as seed for further search and refinement. Once the motion vector with the best goodness of fit has been found, the motion vector is stored in a table or list. In some embodiments, once the motion vector for the next Q+1 blocks have been found (where Q is the numbers of blocks in a row), the graphical computing device applies a median filter to smooth the motion field using neighboring motion vectors and determine the motion vector for the given block $B_i$.

In some embodiments, the motion vector field is used to seed equivalent sized blocks at a higher resolution. In some embodiments, the motion vector field is then refined by the search and calculations described herein to create a motion vector field having a greater block size to maintain the same number of blocks in a frame between resolutions. For example, once the search has been performed for a given block at the lowest resolution image, the method uses the calculated motion vector to seed search in the next higher resolution. The motion vector (s,t), is scaled such that it is (scale×s,scale×t). In some embodiments, the scale value is the same as the scaling between the two resolutions. For example, if the lower resolution is 960×540 pixels and next resolution is 1920×1080, the scaling factor is 2, and the motion vector (s,t) is scaled to (2×s,2×t). An 8×8 pixel block on the lower resolution maps to a 16×16 block at the next layer. In some embodiments, the 16×16 block is subdivided into four 8×8 blocks, where each of these 8×8 blocks use the same seed vector. Small region search is performed at this next layer to find a better, refined match. This updated motion vector is mapped to the blocks in the next highest resolution map.

In some embodiments, the calculations for each level of resolution can be performed in parallel threads. For example, after downscaling, the first frame and second frame, the lowest resolution (e.g., the third resolution) pictures in the stack can be compared to one another with the graphical computing device performing a search to calculate motion vectors for each block. In some embodiments, the method includes calculating a motion vector field for a third resolution of the first frame and a second frame. The graphical computing device can then seed the next resolution level (e.g., the seeded second resolution vector field) while beginning to calculate a third resolution motion vector field for the second frame and a third frame.

In some embodiments, the third resolution motion vector field for the second frame and the third frame is calculated at least partially at the same time as the refined second motion vector field of the first frame and the second frame. In some embodiments, the third resolution motion vector field for the third frame and a fourth frame is calculated at least partially at the same time as the refined second motion vector field of the second frame and the third frame, which is calculated at least partially at the same time as the refined first resolution vector field of the first frame and second frame. By overlapping the calculations, the delay in filtering and displaying the graphical frame may be minimized.

In some embodiments, different regions of the first frame and second frame exhibit different motion vectors. In some embodiments, some blocks or regions of a first frame and a second frame exhibit approximately zero motion between the two frames. For example, in a driving simulation, the camera view may be focused on the car the user is controlling. The car may exhibit relatively little movement between frames when the vehicle is moving in a straight line, and the motion vectors associated with the rendering of the vehicle may have approximately zero magnitude. The road and surrounding environment near the vehicle, however, may exhibit motion vectors with high magnitudes. When the vehicle is turning in the described reference frame, the vehicle may rotate in the field of view, exhibiting motion vectors with orientations that are different from the motion vector field describing the environment.

In some embodiments, the surrounding environment of the vehicle while moving may exhibit a high degree of movement while objects further toward the horizon or in the sky (e.g., having a greater depth value) exhibit relatively little or no motion. In some embodiments, the depth map is used to refine the vector motion field by scaling the motion vector based on the depth of an object. In some embodiments, the blur filter is only applied to regions, objects, blocks, or pixels of the frame when the motion vector has a magnitude above a threshold value. For example, the sky of the frames shows little to no movement. In some embodiments, the graphical computing device only applies the blur filter to the road, vehicle, and surrounding objects and does not apply the blur filter to the sky, reducing the computational demands.

In some embodiments, the threshold value is a percentage of the maximum calculated vector magnitude in the refined first resolution motion vector field. For example, the graphical computing device may apply the blur filter to only regions, objects, blocks, or pixels that exhibit at least 2% of the maximum calculated vector magnitude of the refined first resolution motion vector field. In some embodiments, the graphical computing device may apply the blur filter to only regions, objects, blocks, or pixels that exhibit at least 5% of the maximum calculated vector magnitude. In some embodiments, the graphical computing device may apply the blur filter to only regions, objects, blocks, or pixels that exhibit at least 10% of the maximum calculated vector magnitude. Because those regions, objects, blocks, or pixels show relatively little speed of movement, the viewer expects those regions, objects, blocks, or pixels to exhibit less blur, and therefore, the system can save resources by not applying the blur filter without the user perceiving unexpected visuals. In some embodiments, those regions, objects, blocks, or pixels with a motion vector magnitude less than the threshold value are less likely to exhibit artifacts during compression or encoding, and the application of the blur filter is less important to the visual quality after compression or encoding.

The blur filter is applied to each region, object, block, or pixel based on the direction and magnitude of the motion vector at that point in the frame. For example, once a refined motion vector is calculated for a block in the first frame at the first resolution (e.g., the original, highest resolution), the blur filter can be applied to the pixels of the block. In some embodiments, the motion vector, as calculated, has a large range of possible values for magnitude and orientation. To accommodate all these potential filters, a large number of filter kernels is needed, or the filter has to be adaptive and computationally heavy. Fine granularity in the selection of the filter is not necessary; in a moving scene, a few degrees error in filter direction or area covered is not discernable to a viewer.

In some embodiments, the motion vector is quantized into one of a fixed set of orientations and one of a fixed set of magnitudes. In some examples, the motion vector orientation is quantized into one of 4, 6, 8, 10, 12, 16, or 24 directions. In a particular example, the motion vector orientation is quantized into one of 8 orientations that are positioned at 22.5° angular intervals (e.g., 0°, 22.5°, 45°, 77.5°, 90°, 112.5°, 135°, and 157.5°). In some embodiments, for the purposes of a blur filter, 0° and 180° are equivalent values and the blur filter is applied the same to the motion of an object moving up or down.

In some embodiments, the blur filter is applied in a kernel. In a particular example, the kernel size is limited to three, quantized such as to indicate "slow", "medium" and "fast" speed. Further, the kernel can be simplified using a single kernel size. Therefore, in some embodiments, the motion vector is quantized such that one of 24 filters is chosen for a given motion vector. Experiments conducted by the inventor have shown that the filter can be limited to a one-dimensional filter oriented along one of the quantized directions. In some embodiments, the kernel is further simplified by using a Gaussian weighting along 5-taps. In a particular example a set of three kernels includes:

"slow": [6 32 52 32 6]
"medium": [20 28 32 28 20]
"fast": [23 27 28 27 23]

In some embodiments, the convolution operation is defined as $$O(p) = \frac{1}{\Sigma w} \sum_{i=-2}^{2} w_i \times I(p+i)$$

where $O(p)$ is the output value at point p, $I(p+i)$ is the input sample at (p+i), and $w_i$ are the blur filter coefficients presented above. The output is normalized by dividing by the sum of the coefficient values. The weights are further chosen to avoid a divide. In some embodiments, the weights sum to 128, thus the "divide" can be performed by an arithmetic shift right operation. In some embodiments, the kernel is divisable by 64 or 32.

In some embodiments, a motion-adaptive blur filter according to the present disclosure allows for a lower resource requirement from the graphical computing device and can avoid some of the artifacts present in the frames when using conventional video compression or encoding. In at least some embodiments, the methods and systems described herein allow for better quality images and/or video with less computational resources and less bandwidth to transmit the images and/or video.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: hardware computer-readable storage media and transmission computer-readable media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The present disclosure relates to systems and methods for providing motion-adaptive blur filtering according to at least the examples provided in the sections below:

1. A method of providing visual information to a user, the method comprising:
    at a graphical computer:
        receiving a first frame having a first resolution;
        downscaling the first frame to a second resolution, the second resolution being lower resolution than the first resolution;
        receiving a second frame having the first resolution;
        downscaling the second frame to the second resolution;
        comparing the first frame at the second resolution to the second frame at the second resolution to create a second resolution motion vector field;
        seeding a seeded first resolution motion vector field;
        comparing the first frame at the first resolution to the second frame at the first resolution to refine the seeded first resolution motion vector field to create a refined first resolution motion vector field; and
        applying a blur filter to the first frame at the first resolution based on the refined first resolution motion vector field to create a filtered first frame.
2. The method of section 1, wherein receiving the first frame includes rendering the first frame.
3. The method of sections 1 or 2, wherein the first frame is in RGB color space and the method further comprises converting the first frame into a YCbCr color space.
4. The method of any of sections 1-3, further comprising:
    calculating a depth map based on the first frame at the second resolution; and
    scaling the blur filter based on the depth map.
5. The method of section 4, wherein calculating the depth map includes using one or more of linear perspective depth cues, overlapping depth cues, texture gradient detection, object relative size comparisons.
6. The method of section 4, wherein calculating the depth map includes using motion parallax between the first frame and second frame.
7. The method of any of sections 1-6, wherein seeding the seeded first resolution motion vector field includes seeding four blocks of the seeded first resolution motion vector field with the motion vector data of one block of the second resolution motion vector field, where each of the four blocks of the seeded first resolution motion vector field has the same pixel area as the one block of the second resolution vector field.
8. The method of any of sections 1-7, further comprising:
    downscaling the first frame at the second resolution to a third resolution, the third resolution being less than the second resolution,
    downscaling the second frame at the second resolution to the third resolution,
    comparing the first frame at the third resolution to the second frame at the third resolution to create a third resolution motion vector field, and
    seeding a seeded second resolution motion vector field; and
    wherein comparing the first frame at the second resolution to the second frame at the second resolution to create a second resolution motion vector field includes refining the seeded second resolution motion vector field to create the second resolution motion vector field.
9. The method of any of sections 1-8, the first resolution being at least 1080 vertical resolution.
10. The method of any of sections 1-9 further comprising compressing the filtered first frame with a video compression module.
11. The method of any of sections 1-10, wherein applying a blur filter includes applying the blur filter according to a magnitude and orientation of the first resolution motion vector field.
12. The method of section 11, wherein the orientation of the first resolution motion vector field is quantized.
13. The method of section 11, wherein the magnitude of the first resolution motion vector field is quantized.
14. The method of any of sections 1-13, wherein applying the blur filter includes applying one-dimensional filter kernel.
15. The method of any of sections 1-14, further comprising applying a magnitude threshold to the refined first resolution motion vector field, and wherein applying a blur filter to the first frame includes applying the blur filter to blocks of the refined first resolution motion vector field having a motion vector with a magnitude greater than or equal to the magnitude threshold.
16. A system of generating visual information, the system comprising:
    a graphical computing device comprising:
        a processor;
        a communication device; and
        a hardware storage device in data communication with the processor, the hardware storage device having instructions stored thereon that, when executed by the processor, cause the processor to:
            render a first frame having a first resolution,
            downscale the first frame to a second resolution, the second resolution being lower resolution than the first resolution,
            receive a second frame having the first resolution,
            downscale the second frame to the second resolution,
            compare the first frame at the second resolution to the second frame at the second resolution to create a second resolution motion vector field,
            seed a seeded first resolution motion vector field,
            compare the first frame at the first resolution to the second frame at the first resolution to refine the seeded first resolution motion vector field to create a refined first resolution motion vector field, and
            apply a blur filter to the first frame at the first resolution based on the refined first resolution motion vector field to create a filtered first frame.
17. The system of section 16, wherein the instructions further comprise compressing at least the filtered first frame.
18. The system of section 17, wherein the instructions further comprise transmitting the filtered first frame to a second computing device via the communication device.

19. The system of section 18 further comprising a local computing device in communication with the graphical computing device via a network, wherein the local computing device decompresses the filtered first frame and displays the filtered first frame on a display.

20. A method of providing visual information to a user, the method comprising:
at a graphical computer:
rendering a first frame having a first resolution;
downscaling the first frame to a second resolution, the second resolution being lower resolution than the first resolution;
downscaling the first frame to a third resolution, the third resolution being lower resolution than the second resolution;
rendering a second frame having the first resolution;
downscaling the second frame to the second resolution;
downscaling the second frame to the third resolution;
comparing the first frame at the third resolution to the second frame at the third resolution to create a third resolution motion vector field;
seeding a seeded second resolution motion vector field with vector information of the third resolution motion vector field;
comparing the first frame at the second resolution to the second frame at the second resolution to refine the seeded second resolution motion vector field to create a refined second resolution motion vector field;
seeding a seeded first resolution motion vector field with vector information of the refined second resolution motion vector field;
comparing the first frame at the first resolution to the second frame at the first resolution to refine the seeded first resolution motion vector field to create a refined first resolution motion vector field; and
applying a blur filter to the first frame at the first resolution based on the refined first resolution motion vector field to create a filtered first frame.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of providing visual information to a user, the method comprising:
at a graphical computer:
receiving a first frame having a first resolution;
downscaling the first frame to a second resolution, the second resolution being lower resolution than the first resolution;
receiving a second frame having the first resolution;
downscaling the second frame to the second resolution;
comparing the first frame at the second resolution to the second frame at the second resolution to create a second resolution motion vector field;
seeding a seeded first resolution motion vector field;
comparing the first frame at the first resolution to the second frame at the first resolution to refine the seeded first resolution motion vector field to create a refined first resolution motion vector field; and
applying a blur filter to the first frame at the first resolution based on the refined first resolution motion vector field to create a filtered first frame.

2. The method of claim 1, wherein receiving the first frame includes rendering the first frame.

3. The method of claim 1, wherein the first frame is in RGB color space and the method further comprises converting the first frame into a YCbCr color space.

4. The method of claim 1, further comprising:
calculating a depth map based on the first frame at the second resolution; and
scaling the blur filter based on the depth map.

5. The method of claim 4, wherein calculating the depth map includes using one or more of linear perspective depth cues, overlapping depth cues, texture gradient detection, object relative size comparisons.

6. The method of claim 4, wherein calculating the depth map includes using motion parallax between the first frame and second frame.

7. The method of claim 1, wherein seeding the seeded first resolution motion vector field includes seeding four blocks of the seeded first resolution motion vector field with the motion vector data of one block of the second resolution motion vector field, where each of the four blocks of the seeded first resolution motion vector field has the same pixel area as the one block of the second resolution vector field.

8. The method of claim 1, further comprising:
downscaling the first frame at the second resolution to a third resolution, the third resolution being less than the second resolution,
downscaling the second frame at the second resolution to the third resolution,
comparing the first frame at the third resolution to the second frame at the third resolution to create a third resolution motion vector field, and
seeding a seeded second resolution motion vector field; and
wherein comparing the first frame at the second resolution to the second frame at the second resolution to create a second resolution motion vector field includes refining the seeded second resolution motion vector field to create the second resolution motion vector field.

9. The method of claim 1, the first resolution being at least 1080 vertical resolution.

10. The method of claim 1 further comprising compressing the filtered first frame with a video compression module.

11. The method of claim 1, wherein applying a blur filter includes applying the blur filter according to a magnitude and orientation of the first resolution motion vector field.

12. The method of claim 11, wherein the orientation of the first resolution motion vector field is quantized.

13. The method of claim 11, wherein the magnitude of the first resolution motion vector field is quantized.

14. The method of claim 1, wherein applying the blur filter includes applying one-dimensional filter kernel.

15. The method of claim 1, further comprising applying a magnitude threshold to the first resolution motion vector field, and wherein applying a blur filter to the first frame includes applying the blur filter to blocks of the refined first resolution motion vector field having a motion vector with a magnitude greater than or equal to the magnitude threshold.

16. A system of generating visual information, the system comprising:
a graphical computing device comprising:
a processor;
a communication device; and
a hardware storage device in data communication with the processor, the hardware storage device having instructions stored thereon that, when executed by the processor, cause the processor to:
render a first frame having a first resolution,
downscale the first frame to a second resolution, the second resolution being lower resolution than the first resolution,
receive a second frame having the first resolution,
downscale the second frame to the second resolution,
compare the first frame at the second resolution to the second frame at the second resolution to create a second resolution motion vector field,
seed a seeded first resolution motion vector field,
compare the first frame at the first resolution to the second frame at the first resolution to refine the seeded first resolution motion vector field to create a refined first resolution motion vector field, and
apply a blur filter to the first frame at the first resolution based on the refined first resolution motion vector field to create a filtered first frame.

17. The system of claim 16, wherein the instructions further comprise compressing at least the filtered first frame.

18. The system of claim 17, wherein the instructions further comprise transmitting the filtered first frame to a second computing device via the communication device.

19. The system of claim 18 further comprising a local computing device in communication with the graphical computing device via a network, wherein the local computing device decompresses the filtered first frame and displays the filtered first frame on a display.

20. A method of providing visual information to a user, the method comprising:
at a graphical computer:
rendering a first frame having a first resolution;
downscaling the first frame to a second resolution, the second resolution being lower resolution than the first resolution;
downscaling the first frame to a third resolution, the third resolution being lower resolution than the second resolution;
rendering a second frame having the first resolution;
downscaling the second frame to the second resolution;
downscaling the second frame to the third resolution;
comparing the first frame at the third resolution to the second frame at the third resolution to create a third resolution motion vector field;
seeding a seeded second resolution motion vector field with vector information of the third resolution motion vector field;
comparing the first frame at the second resolution to the second frame at the second resolution to refine the seeded second resolution motion vector field to create a refined second resolution motion vector field;
seeding a seeded first resolution motion vector field with vector information of the refined second resolution motion vector field;
comparing the first frame at the first resolution to the second frame at the first resolution to refine the seeded first resolution motion vector field to create a refined first resolution motion vector field; and
applying a blur filter to the first frame at the first resolution based on the refined first resolution motion vector field to create a filtered first frame.

* * * * *